United States Patent
McLain et al.

(10) Patent No.: US 6,708,019 B2
(45) Date of Patent: Mar. 16, 2004

(54) METHOD AND APPARATUS USING TRANSMIT BEAM LOBING FOR IDENTIFYING AN INTERFERING MOBILE TERMINAL

(75) Inventors: Christopher John McLain, Seattle, WA (US); Michael de La Chapelle, Bellevue, WA (US); David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 10/011,091

(22) Filed: Dec. 6, 2001

(65) Prior Publication Data

US 2002/0146982 A1 Oct. 10, 2002

Related U.S. Application Data

(60) Provisional application No. 60/281,548, filed on Apr. 4, 2001.

(51) Int. Cl.$^7$ ............................................. H04B 15/00
(52) U.S. Cl. ................. 455/63.1; 455/431; 342/352
(58) Field of Search ................. 455/427, 429, 455/430, 63.1, 67.13, 67.15, 431, 13.1; 342/352, 353, 359

(56) References Cited

U.S. PATENT DOCUMENTS

| | | | |
|---|---|---|---|
| 4,119,964 A | * 10/1978 | Johannsen et al. | ........... 343/173 |
| 4,963,890 A | * 10/1990 | Perrotta et al. | .............. 342/359 |
| 5,697,056 A | * 12/1997 | Tayloe | .......................... 455/513 |
| 5,822,429 A | 10/1998 | Casabona et al. | |
| 5,930,680 A | 7/1999 | Lusignan | |
| 6,075,969 A | 6/2000 | Lusignan | |
| 6,091,936 A | 7/2000 | Chennakeshu et al. | |
| 6,107,960 A | 8/2000 | Krasner | |
| 6,272,679 B1 | 8/2001 | Norin | |
| 6,330,462 B1 | 12/2001 | Chen | |
| 6,374,096 B1 | * 4/2002 | Parr | ......................... 455/226.1 |
| 6,417,803 B1 | * 7/2002 | de La Chapelle | ........... 342/359 |
| 6,483,458 B1 | * 11/2002 | Carson | ........................ 342/367 |
| 2002/0145562 A1 | * 10/2002 | McLain et al. | |

FOREIGN PATENT DOCUMENTS

EP 1 052 790 A1 5/1999

OTHER PUBLICATIONS

Hrycenko et al., "Adjacent Satellite and Ground Station Interference" 130$^{th}$ SMPTE Technical Conference, NY, Oct. 1988.*

Fanke, UHF Satcom Downlink Interference for the mobile.*

* cited by examiner

*Primary Examiner*—Charles Appiah
(74) *Attorney, Agent, or Firm*—Harness, Dickey & Pierce P.L.C.

(57) ABSTRACT

A method for rapidly monitoring and detecting a mobile terminal causing RF interference with one or more satellites orbiting in the vicinity of a target satellite, from a plurality of mobile terminals accessing the target satellite. Each mobile terminal performs a transmit lobing signal sequence and a ground-based component in the form of a Network Operation Center (NOC) analyzes the signals transmitted by each mobile platform. The NOC determines a ratio of energy-per-bit to noise spectral density (Eb/No) value for the signals transmitted by each mobile platform and compares these values to a predetermined Eb/No value. If the Eb/No values for a given mobile platform deviate by more than a predetermined magnitude from the predetermined Eb/No value, then the NOC identifies that given mobile platform as causing the unintended RF interference with the adjacent satellite(s).

14 Claims, 3 Drawing Sheets

METHOD AND APPARATUS USING TRANSMIT BEAM LOBING FOR IDENTIFYING AN INTERFERING MOBILE TERMINAL

CROSS REFERENCE TO RELATED APPLICATIONS

This application claims priority from provisional application Ser. No. 60/281,548, filed Apr. 4, 2001.

FIELD OF THE INVENTION

The present invention relates to mobile RF terminals required to conduct bi-directional communications with a base station via a satellite link, and more particularly to a method and apparatus for quickly identifying which one of a plurality of mobile terminals is causing interference with one or more satellites orbiting in the vicinity of a target transponded satellite.

BACKGROUND OF THE INVENTION

With mobile RF terminals located on mobile platforms such as aircraft, cruise ships and other moving platforms, communicating with a ground station via a transponded satellite, there is always the remote possibility, in spite of the safeguards that may be built into the mobile terminal, that the terminal may fail in an unanticipated manner. In such event, there is the possibility that the mobile terminal may cause interference with other satellites orbiting in the geo arc adjacent the target satellite with which the mobile terminal is communicating.

It is also recognized that Fixed Services Satellite (FSS) operators may have difficulty in locating interference from VSAT (Very Small Aperture Terminal) systems that consist of thousands of unsophisticated terminals at remote sites. This problem is compounded when the remote terminals comprise mobile terminals that are located on fast moving platforms, such as jet aircraft.

Therefore, there exists a need for the ground station in communication with a plurality of mobile terminals via a transponded satellite to be able to quickly identify a malfunctioning mobile terminal which is causing interference with non-target satellites and to quickly resolve the interference incident.

SUMMARY OF THE INVENTION

The present invention relates to a system and method for quickly determining which one of a plurality of mobile terminals communicating with a base station, such as a ground-based communication system or segment, is causing interference with one or more satellites adjacent a target transponded satellite. The system and method uses a network operations center (NOC) of the ground-based segment to command each mobile terminal of each aircraft utilizing the target transponded satellite to carry out a transmit lobing sequence, to thereby determine the off-axis effective isotropic radiated power (EIRP) of the signal transmitted by the transmit antenna of each mobile terminal.

The NOC uses the information obtained during the transmit lobing process to determine whether a parameter of the transmitted signals received by it during the transmit lobing process indicates that the mobile terminal is the cause of interference. If it is not, then the NOC performs the transmit lobing sequence with the mobile terminal of a second aircraft accessing the transponded target satellite, and thereafter with every mobile terminal accessing the transponded target satellite until the mobile terminal causing the interference is detected.

DETAILED DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
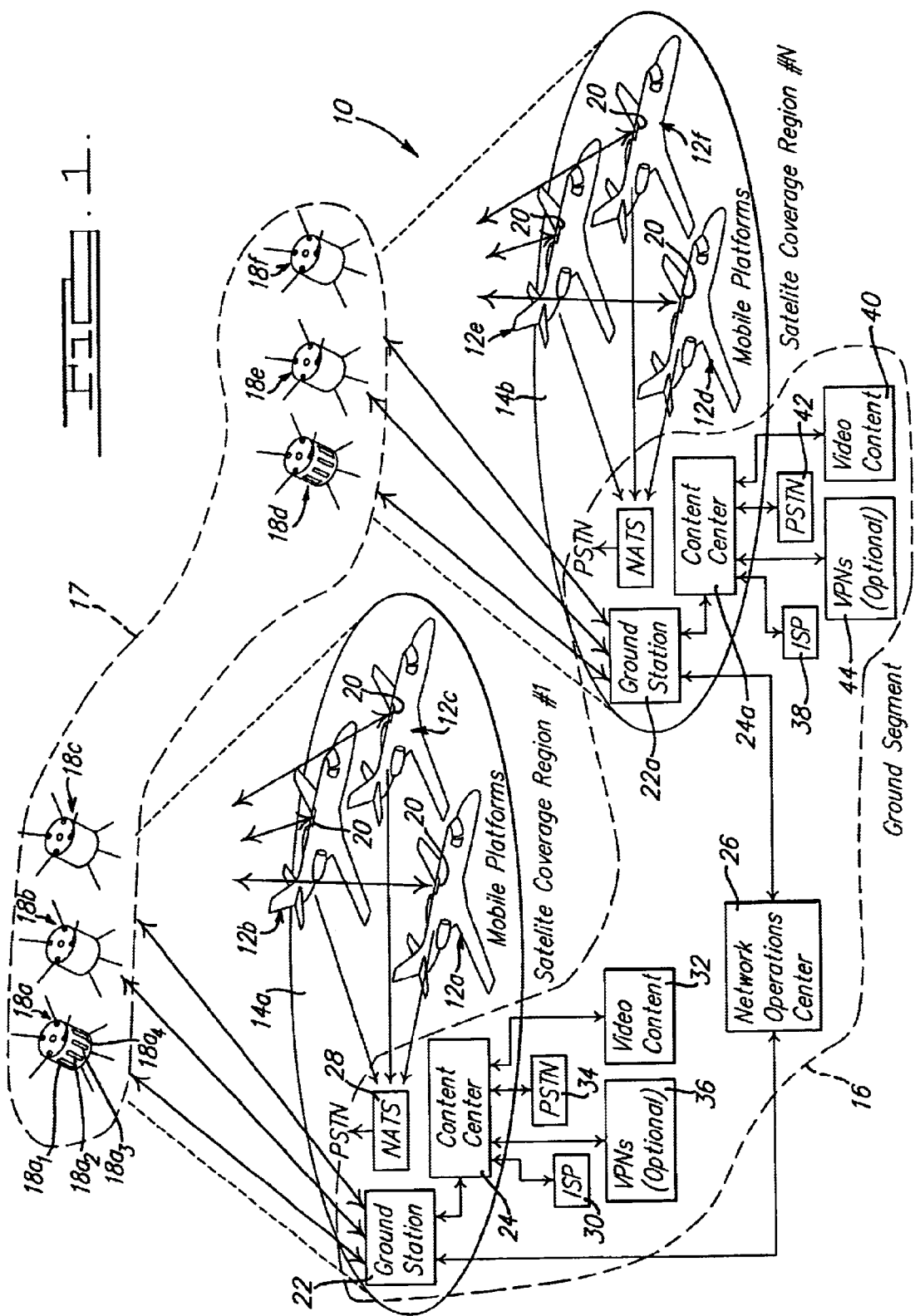
FIG. 1 is a simplified block diagram of a system for implementing the method of the present invention.

Referring to FIG. 1, there is shown a system 10 in accordance with a preferred embodiment of the present invention for providing data content to and from a plurality of mobile platforms 12a–12f in one or more distinct coverage regions 14a and 14b. The system 10 generally comprises a ground segment 16, a plurality of satellites 18a–18f forming a space segment 17, and a mobile system or terminal 20 disposed on each mobile platform 12. The mobile platforms 12 could comprise aircraft, cruise ships or any other moving vehicle. Thus, the illustration of the mobile platforms 12 as aircraft in the figures herein, and the reference to the mobile platforms as aircraft throughout the following description, should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example, satellite 18a is illustrated having four transponders $18a_1$–$18a_4$. It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a is also in bi-directional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the invention may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
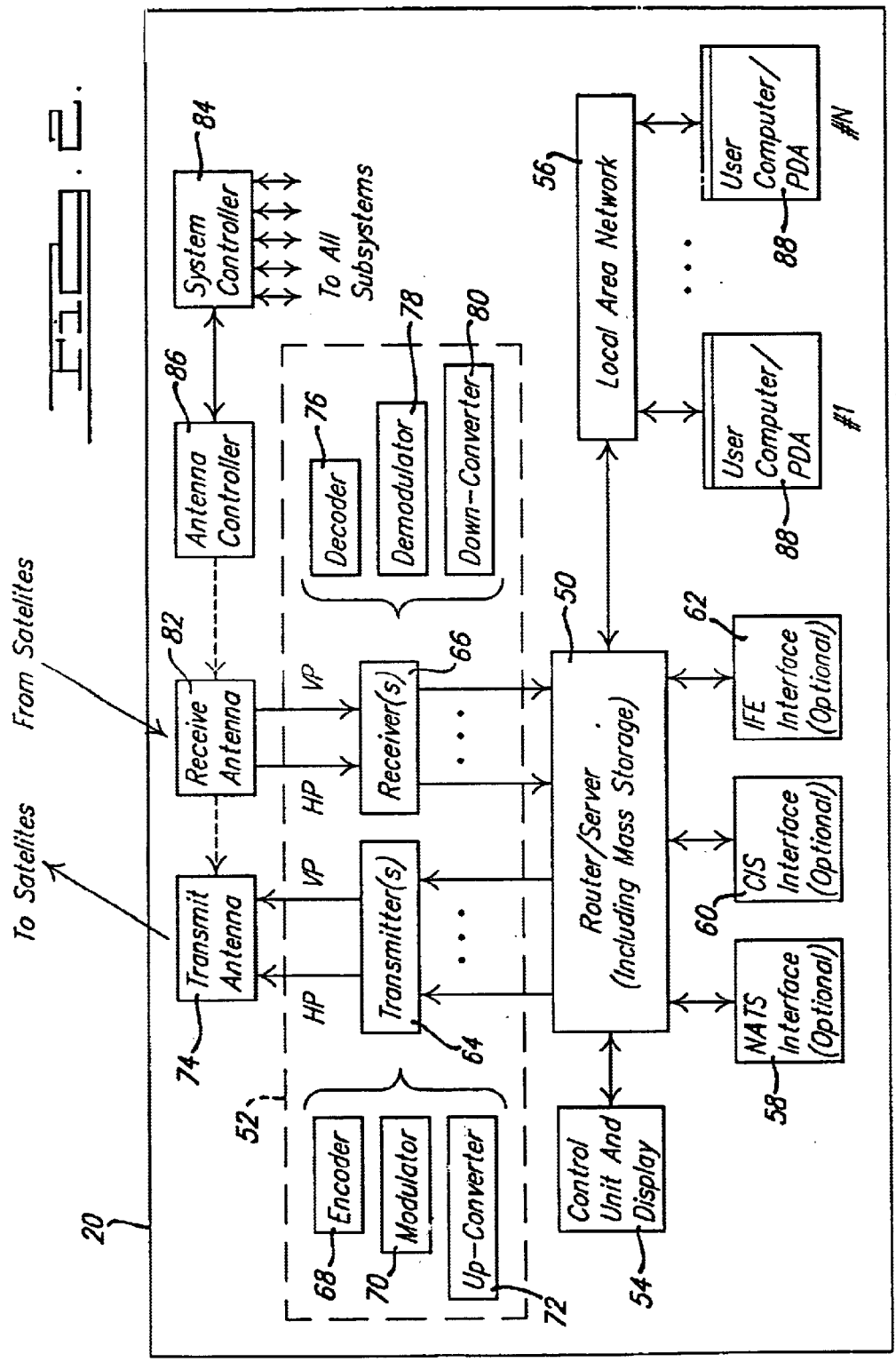
FIG. 2 is a simplified block diagram of a mobile terminal used on each mobile platform, for enabling the mobile platform to establish a communication link with a transponded satellite of the system.

Referring now to FIG. 2, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$–$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and downconverts the encoded RF signals to produce video and audio signals, as well as data signals, that are input to the server 50. The server 50 operates to filter off and discard any data content not intended for users on the aircraft 12 and then forwards the remaining data content via the LAN 56 to the appropriate access stations 88.

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile system 20 back to the ground station 22 represent point-to-point links that are individually assigned and dynamically managed by the NOC 26 of the ground segment 16. For the system 10 to accommodate several hundred or more aircraft 12, multiple aircraft need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile systems 20 may be assigned to a single transponder $18a_1$–$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of the aircraft's 12 position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders $18a_1$–$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in interference from satellites other than the target satellite being received by a particular mobile system 20. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one preferred embodiment of the system 10, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile systems 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna.

VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74, in some instances, may create an antenna beam that is wide enough to irradiate satellites that are adjacent to the target satellite along the geosynchronous arc, which could create an interference problem. The likelihood of this potential problem occurring is significantly reduced by employing spread spectrum modulation techniques on the return link transmissions as well. The transmitted signal from the transmit antenna 74 is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

In the event of an interference situation arising, the system and method of the present invention makes use of a well-known transmit lobing sequence to quickly identify which one of a plurality of mobile terminals 20 is causing an interference event with a satellite adjacent to a transponded target satellite. The present invention, however, makes use of the transmit lobing sequence in connection with the transmit antenna 74 of each mobile terminal 20 rather than the receive antenna 82, where the lobing sequence is typically employed in detecting the beam center of the receive beam received by the receive antenna of the mobile terminal.

Figure 3:
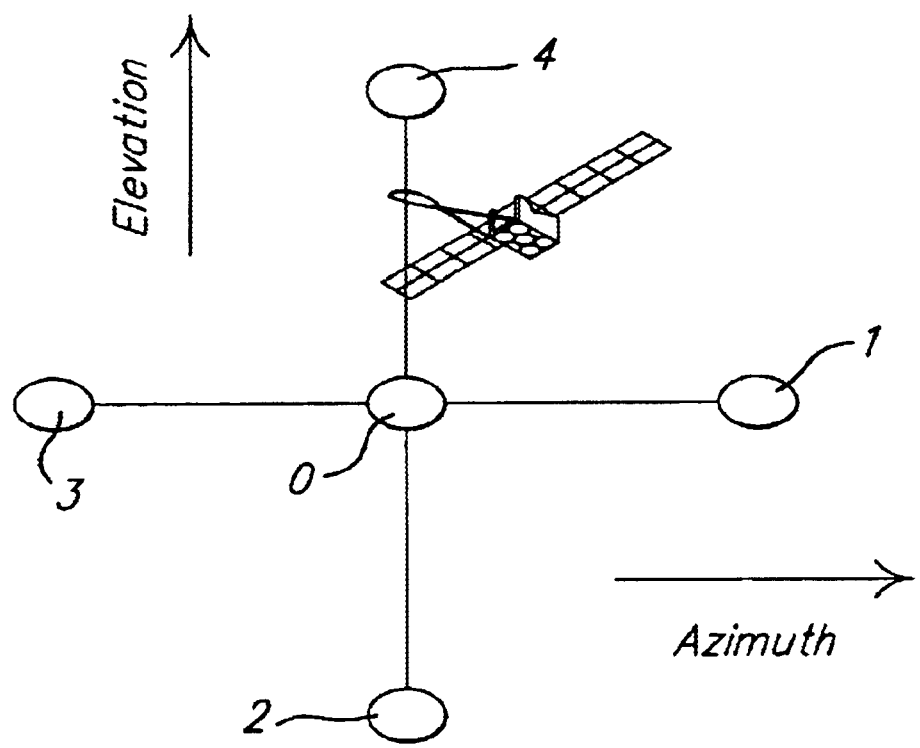
FIG. 3 is an illustration of the five points at which the transmit antenna of a mobile terminal is pointed relative to the target satellite, during the transmit lobbing sequence.

The transmit lobing sequence of the present invention involves having each mobile terminal 20, one at a time, point its transmit antenna 74 slightly off-axis by a small angle and then transmit one or more signals to the target satellite, in this example satellite 18a. Referring to FIG. 3, preferably two measurements are taken (points 1 and 3) with the transmit antenna 74 pointed off-axis in the azimuth plane of the transponded target satellite 18a. Two measurements are then taken with the transmit antenna 74 pointed off-axis in elevation from the transponded satellite 18a (points 2 and 4), and one measurement is taken with the antenna pointed directly at the expected location of the transponded satellite.

The NOC 26 measures the received Eb/No (ratio of energy-per-bit to noise spectral density) of each signal it receives. During this process the NOC 26 allocates a higher off-axis EIRP density to the mobile terminal 20 to account for the off-axis pointing. This test verifies the mainlobe beam pattern, aircraft pointing accuracy and off-axis power levels.

Once one mobile terminal 20 completes the above-described transmit lobing process, then another mobile terminal is commanded by the NOC 26 to perform the same transmit lobing process. This testing of each mobile terminal 20, in sequential fashion, continues until the NOC 26 detects that a signal parameter, such as the Eb/No (ratio of energy-per-bit to noise spectral density), of the received transmit lobing signals deviates significantly from the expected Eb/No. In this manner, the NOC 26 can quickly determine which one of a plurality of mobile terminals 20 is causing the interference to the adjacent, non-target satellite(s) 18. It will be appreciated that a variety of other signal parameters, such as carrier-to-noise ratio, could also be used instead of Eb/No to provide an indication of either signal strength of signal quality of the received signals.

Using the above described process, a single mobile terminal can be tested and evaluated by the NOC 26 within a time span of 1–5 seconds. A transponded satellite in communication with up to 30 aircraft can be tested and evaluated in less than five minutes.

During the above-described process, the NOC 26 further preferably maintains aggregate power spectral density limits for all aircraft 12 having mobile terminals 20 carrying out the transmit lobing sequence. The process for monitoring the aggregate power spectral density (PSD) of the signals transmitted by the mobile terminals is described in detail in co-pending U.S. application Ser. No. 09/728,605 filed Dec. 1, 2000, and hereby incorporated by reference. The NOC 26 also maintains sufficient headroom in the transponder transponding the signals from each of the mobile platforms. The NOC 26 can also use the information gleaned from the transmit lobing process to determine the transmit power settings for the aircraft and can then command each aircraft to have its mobile terminal transmit in accordance with the power setting determined by the NOC.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for determining which one of a plurality of mobile terminals is causing an interfering event with one or more satellites orbiting in a vicinity of a transponded target satellite with which said mobile terminals are in communication with, said method comprising the steps of:

using a ground-based component to command each of said mobile terminals in communication with said transponded satellite to perform a transmit lobing sequence with a transmit antenna associated therewith by aiming its associated said transmit antenna at a plurality of positions off-axis of said target satellite and transmitting a plurality of signals thereto;

using said target transponder to relay said signals to said ground-based component;

using said ground-based component to determine a parameter of said signals transmitted to said target satellite for each one of said mobile terminals, said parameter representing at least one of signal strength or signal quality;

using said ground-based component to compare said parameter of said signals from each of said mobile terminals to a predetermined signal value to determine which one of said signal parameters deviates from said predetermined signal value by more than a predetermined amount; and identifying said mobile terminal which has transmitted said signals generating a parameter which deviates from said predetermined signal value by more than said predetermined amount, as said mobile terminal which is causing said interfering event.

2. The method of claim 1, where said ground-based component comprises a Network Operations Center (NOC).

3. The method of claim 1, wherein said transmit lobing signal sequence comprises having each said mobile terminal transmit two signals offset in elevation from a known center of said target satellite.

4. The method of claim 1, wherein said transmit lobing signal sequence comprises having each said mobile terminal transmit two signals offset in azimuth from a known center of said target satellite.

5. The method of claim 1, wherein said mobile terminals perform said transmit lobing signal sequence in sequential fashion until each one of said terminals performed said transmit lobing signal sequence.

6. The method of claim 1, wherein said parameter comprises a ratio of energy-per-pit to noise spectral density (Eb/No).

7. A method for determining which one of a plurality of mobile terminals is causing an interfering event with one or more satellites orbiting in the vicinity of a transponded target satellite with which said mobile terminals are in communication with, said method comprising the steps of:

using a base station having a network operations center (NOC) to command a first one of said mobile terminals to perform a transmit lobing signal sequence with its associated said transmit antenna by aiming its said transmit antenna at a plurality of positions off-axis of said target satellite and transmitting a plurality of signals;

using said target satellite to receive said signals and to relay said signals to said NOC;

using said NOC to determine a parameter of said signals indicative of at least one of signal strength or signal quality;

using said NOC to determine if said parameter of said signals from said first mobile terminal deviates sufficiently from an expected value;

if said NOC determines that said signals from said first mobile platform do not deviate sufficiently from an expected value, then using said NOC to command each remaining one of said plurality of mobile terminals, one at a time in sequential fashion, to perform said transmit lobing sequence until one of said mobile terminals is determined by said NOC to be transmitting signals which generate a said parameter which deviates by a predetermined magnitude from an expected value, thereby indicating to said NOC that said one mobile terminal is causing said interfering event.

8. The method of claim 7, wherein said transmit lobing signal sequence comprises having each said mobile terminal transmit two signals offset in azimuth from a known center of said target satellite.

9. The method of claim 7, wherein said transmit lobing signal sequence comprises having each said mobile terminal transmit two signals offset in elevation from a know center of said target satellite.

10. The method of claim 7, wherein said parameter comprises a ratio of energy-per-pit to noise spectral density (Eb/No).

11. A method for determining which one of a plurality of mobile terminals is causing an interfering event with one or more satellites orbiting in a vicinity of a transponded target satellite with which said mobile terminals are in communication with, said method comprising the steps of:

using a base station having a ground-based component to command a first one of said mobile terminals to perform a transmit lobing signal sequence with its associated said transmit antenna by aiming its said transmit antenna at a plurality of positions off-axis of said target satellite and transmitting a plurality of signals;

using said target satellite to receive said signals and to relay said signals to said NOC;

using said ground-based component to evaluate said signals to determine a ratio of energy-per-bit to noise spectral density (Eb/No) value of each of said signals;

using said ground-based component to determine if any of said Eb/No values deviate more than a predetermined amount from an expected Eb/No value;

identifying said mobile terminal which has transmitted said signals having said Eb/No value which differs by more than said predetermined amount from said expected Eb/No value as being said mobile terminal which is causing said interfering event; and using said ground-based component to inform said mobile terminal of a needed action to take to cease causing said interfering event.

12. The method of claim 11, wherein said transmit lobing signal sequence comprises having each said mobile terminal transmit two signals offset in azimuth from a known center of said target satellite.

13. The method of claim 11, wherein said transmit lobing signal sequence comprises having each said mobile terminal transmit two signals offset in elevation from a known center of said target satellite.

14. The method of claim 11, wherein said mobile terminals perform said transmit lobing signal sequence in sequential fashion until each of said mobile terminals has completed performing said sequence.

* * * * *